United States Patent
Biggs et al.

(10) Patent No.: US 11,032,709 B2
(45) Date of Patent: *Jun. 8, 2021

(54) HOST A CONFERENCE CALL

(71) Applicant: Hewlett-Packard Development Company, L.P., Houston, TX (US)

(72) Inventors: Kent E Biggs, Spring, TX (US); Yolanda Maria Rivas, Spring, TX (US); Robert C Brooks, Spring, TX (US); Richard E Hodges, Spring, TX (US); Harold S Merkel, Houston, TX (US); James M Mann, Spring, TX (US); Lorri L Jefferson, Spring, TX (US); Derek Labron Everett, Houston, TX (US); Thomas Bonola, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/511,370

(22) Filed: Jul. 15, 2019

(65) Prior Publication Data

US 2019/0342108 A1 Nov. 7, 2019

Related U.S. Application Data

(63) Continuation of application No. 15/521,984, filed as application No. PCT/US2014/070816 on Dec. 17, 2014, now Pat. No. 10,374,815.

(51) Int. Cl.
*G06F 15/16* (2006.01)
*H04W 12/08* (2021.01)
(Continued)

(52) U.S. Cl.
CPC ............. *H04W 12/08* (2013.01); *H04L 12/18* (2013.01); *H04L 12/1818* (2013.01);
(Continued)

(58) Field of Classification Search
CPC . H04L 12/1818; H04L 12/1822; H04L 29/08; H04L 63/107; H04W 12/08
(Continued)

(56) References Cited

U.S. PATENT DOCUMENTS 7,707,250 B2 * 4/2010 Guccione ............. G06Q 10/109
709/205
7,734,283 B2 * 6/2010 Sebban ................. H04M 15/00
455/414.3

(Continued)

FOREIGN PATENT DOCUMENTS

| CN | 1522038 | 8/2004 |
|---|---|---|
| CN | 1605070 | 4/2005 |

(Continued)

OTHER PUBLICATIONS

M. Wallick et al., "A Portable Solution for Automatic Lecture Room Camera Management," Mar. 26, 2004, pp. 1-4, <research.microsoft.com/.

(Continued)

*Primary Examiner* — Moustafa M Meky
(74) *Attorney, Agent, or Firm* — HP Inc. Patent Department (57) ABSTRACT

Examples disclosed herein relate to a conference call host. Examples include to establishing, by a first computing system, a first secure connection to a second computing system via a wireless network in response to receiving a secure connection request from the second computing system; the first computing system and the second computing system are in physical proximity to each other. Examples (Continued)

include to provide an operating system session to the second computing system through the secure connection while the first computing system and the second computing system remain in physical proximity to each other; the operating system is stored on and executable by the first computing system. Examples include to provide a connection to a conferencing platform to the second computing system via the first secure connection, the conference call at least among the first computing system, the second computing system, and a remote user.

15 Claims, 5 Drawing Sheets

(51) Int. Cl.
    *H04L 12/18*     (2006.01)
    *H04L 29/06*     (2006.01)
    *H04L 29/08*     (2006.01)
    *H04N 7/15*     (2006.01)

(52) U.S. Cl.
    CPC .......... *H04L 12/1822* (2013.01); *H04L 29/08* (2013.01); *H04L 63/107* (2013.01); *H04N 7/15* (2013.01)

(58) Field of Classification Search
    USPC ......................................................... 709/204
    See application file for complete search history.

(56) References Cited

U.S. PATENT DOCUMENTS

| | | | | |
|---|---|---|---|---|
| 7,899,445 | B2 * | 3/2011 | Guccione | H04M 3/561 |
| | | | | 455/416 |
| 8,000,276 | B2 * | 8/2011 | Scherzer | H04W 24/10 |
| | | | | 370/310.1 |
| 8,078,164 | B2 * | 12/2011 | Ganesan | H04W 88/18 |
| | | | | 455/432.1 |
| 8,813,218 | B2 | 8/2014 | Wang | |
| 8,886,181 | B2 * | 11/2014 | Ganesan | H04W 24/08 |
| | | | | 455/432.1 |
| 9,024,008 | B2 * | 5/2015 | Kiss | C12N 15/1003 |
| | | | | 536/25.4 |
| 9,197,420 | B2 * | 11/2015 | Cross | H04L 9/3247 |
| 9,288,180 | B2 * | 3/2016 | Chen | H04L 61/2007 |
| 9,332,128 | B2 * | 5/2016 | Backhaus | H04M 3/42255 |
| 9,338,194 | B2 | 5/2016 | Hendrickson | |
| 9,521,116 | B2 * | 12/2016 | Durbin | H04L 12/4641 |
| 9,538,136 | B2 * | 1/2017 | Chu | H04M 3/568 |
| 9,674,721 | B2 * | 6/2017 | Chiang | H04W 8/24 |
| 9,729,336 | B2 | 8/2017 | Gupta | |
| 10,051,675 | B2 * | 8/2018 | Durbin | H04W 12/08 |
| 10,143,018 | B2 * | 11/2018 | Sheriff | H04W 36/24 |
| 10,206,154 | B2 * | 2/2019 | Ganesan | H04W 36/18 |
| 10,374,815 | B2 * | 8/2019 | Biggs | H04L 12/1818 |
| 10,554,420 | B2 * | 2/2020 | Cross | H04W 12/04031 |
| 2005/0213729 | A1 | 9/2005 | Rodman | |
| 2008/0084984 | A1 | 4/2008 | Levy et al. | |
| 2008/0239995 | A1 | 10/2008 | Lee et al. | |
| 2008/0298279 | A1 | 12/2008 | Giloi | |
| 2010/0027775 | A1 | 2/2010 | Anson | |
| 2011/0173270 | A1 | 7/2011 | Uchida et al. | |
| 2011/0271192 | A1 | 11/2011 | Jones et al. | |
| 2011/0302408 | A1 | 12/2011 | McDermott et al. | |
| 2012/0240199 | A1 | 9/2012 | Bussani | |
| 2012/0278408 | A1 | 11/2012 | Seferian et al. | |
| 2014/0098714 | A1 | 4/2014 | Morsy et al. | |
| 2014/0349611 | A1 | 11/2014 | Kant et al. | |
| 2014/0359753 | A1 | 12/2014 | Wang | |
| 2015/0029302 | A1 | 1/2015 | Hendrickson | |
| 2016/0043871 | A1 * | 2/2016 | Cross | H04L 63/0823 |
| | | | | 713/171 |
| 2018/0159694 | A1 * | 6/2018 | Cross | H04L 9/3263 |
| 2018/0241788 | A1 * | 8/2018 | Takaichi | A63F 13/87 |

FOREIGN PATENT DOCUMENTS

| | | |
|---|---|---|
| CN | 1826833 A | 8/2006 |
| CN | 1867009 | 11/2006 |
| CN | 102763401 | 10/2012 |
| EP | 2224666 | 9/2010 |
| TW | I355828 | 1/2012 |
| WO | WO-2011015019 | 2/2011 |
| WO | WO-2014-043274 A2 | 3/2014 |

OTHER PUBLICATIONS

PCT Search Report/Written Opinion—Application No. PCT/US2014/070816 dated Sep. 10, 2015—11 pages.

* cited by examiner

HOST A CONFERENCE CALL

PRIORITY INFORMATION

This application is a continuation of U.S. National Stage application Ser. No. 15/521,984 filed on Apr. 26, 2017, which claims priority to International Application No. PCT/US2014/070816 filed on Dec. 17, 2014. The contents of which are incorporated herein by reference in its entirety.

BACKGROUND

Computing devices such as laptops, smart phones, and tablets have increased in popularity. Many individuals own at least one (if not multiple) of these types devices, which may frequently be used for personal tasks such as checking email, browsing the Internet, taking photos, playing games, and other such activities. Additionally, these devices are also being used to perform basic business related tasks, such as email, accessing business web services, and internet browsing.

BRIEF DESCRIPTION OF THE DRAWINGS

The following detailed description references the drawings, wherein.

DETAILED DESCRIPTION

Many enterprise business users desire to use their own personal computing devices, such as smart phones, tablets, laptops, and desktops, in an enterprise environment (i.e., within the enterprise IT infrastructure). These devices are referred to as "bring your own device" or BYOD devices. The BYOD devices may run an operating system or applications that are not supported by the enterprise environment. For example, these BYOD devices may have Android, Chrome, iOS, or other operating systems commonly associated with such devices. Such operating systems may not integrate well (or at all) with the enterprise environment. For example, certain applications or data executing on or stored within the enterprise environment may be inaccessible to BYOD devices because the BYOD devices' operating systems cannot connect to or interface with the enterprise environment. Additionally, the variety of operating systems can cause user frustration with having to learn new or different types of operating system interfaces.

Moreover, the addition of BYOD devices in the enterprise environment introduces security concerns. For example, a user's device may contain malicious code such as a software virus. Once the BYOD device is connected to the enterprise environment, the malicious code could propagate through the enterprise environment to harm other connected hardware. Another security concern is data security. Enterprise customers do not want their data, such as presentations, specifications and email, stored on a BYOD device.

BYOD devices also increase the complexity of the enterprise environment by adding additional types of devices that are to be supported within the enterprise environment. Enterprise environment administrators must deploy device management applications, help desk support, software updates, and security devices to accommodate the variety of BYOD devices within the enterprise environment.

Currently, an enterprise environment may support BYOD devices by employing a variety of desktop virtualization approaches. In this case, the BYOD devices connect to the enterprise environment using a hosted or virtual desktop environment that is hosted virtually on a server within the enterprise environment. While this provides a secure connection to the enterprise environment, the solution is dependent upon the health and consistency of the secure connection. If the secure connection fails (e.g., the network or Internet goes down), the virtual desktop environment is unavailable. Another virtualization approach is offline caching mode, whereby when a connection to the virtualized environment is not available, the last experience is cached offline on the BYOD device and synced back when connection becomes available. This also raises security concerns because the data is no longer secured only in the data center, but it is also propagated to the BYOD devices. These virtualization approaches may not be effective for applications in which the BYOD device is hosting real time activities.

Various implementations will be described below by referring to several examples of wirelessly providing an operating system session from a host computing system to a user computing system when the host computing system and the user computing system are in physical proximity. For example, a host computing system may establish a secure connection to a user computing system in response to receiving a secure connection request from the user computing system, wherein the host computing system and the user computing system are in physical proximity to each other. The host computing system may then provide an operating system session to the user computing system through the secure connection while the host computing system and the user computing system remain in physical proximity to each other, wherein the operating system is stored on and executable by the host computing system. The host computing system may also provide data associated with a user of the user computing system to the user computing system via the operating system session through the secure connection, wherein the data associated with the user of the user computing device is stored in a data store of the host computing system. In an example, the user computing system may host a conference call once a secure connection has been established with the host computing system. The conference call may be between the user computing system, the host computing system, and a remote user. Additional examples are described below.

In some implementations, BYOD devices may be provided an operating system session even if the host computing device cannot connect to the enterprise environment. A user of a BYOD device may continue to access his data even when the host computing device cannot connect to the enterprise environment. Additionally, a common user operating system interface, such as a Microsoft® Windows® operating system, may be provided. Security, management, and compatibility issues are also reduced or eliminated with the host computing system of the present disclosure. These and other advantages will be apparent from the description that follows.

Figure 1:
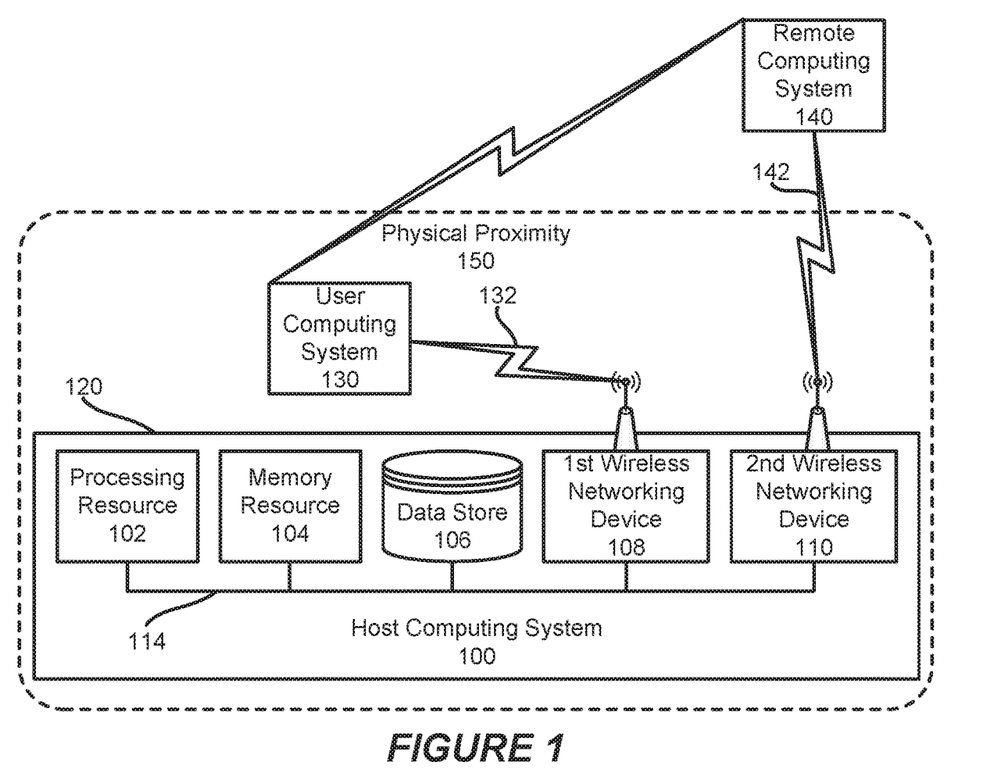
FIG. 1 illustrates a block diagram of a host computing system for wirelessly providing an operating system session to a user computing system in physical proximity to the host computing system via a secure connection according to an example.

FIG. 1 illustrates a block diagram of a host computing system 100 for wirelessly providing an operating system session to a user computing system 130 in physical proximity 150 to the host computing system 100 via a secure connection 132 according to examples of the present disclosure. FIG. 1 includes particular components, modules, etc. according to various examples. However, in different implementations, more, fewer, and/or other components, modules, arrangements of components/modules, etc. may be used according to the teachings described herein. In addition, various components, modules, etc. described herein may be implemented as software modules, hardware modules, special-purpose hardware (e.g., application specific hardware, application specific integrated circuits (ASICs), embedded controllers, hardwired circuitry, etc.), or some combination of these.

The host computing system 100 may include a processing resource 102 that represents generally any suitable type or form of processing unit or units capable of processing data or interpreting and executing instructions. The instructions may be stored on a non-transitory tangible computer-readable storage medium, such as memory resource 104, or on a separate device (not shown), or on any other type of volatile or non-volatile memory that stores instructions to cause a programmable processor to perform the techniques described herein. Alternatively or additionally, the host computing system 100 may include dedicated hardware, such as integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory.

In addition to the processing resource 102 and the memory resource 104, the host computing system 100 may include a data store 106 for storing a variety of data. For example, the data store 106 stores user data relating to the user of the user computing system 130. The user data may include emails, documents, photographs, and other data associated with the user of the user computing system 130. In addition, the data store 106 stores an operating system that is executable by the processing resource 102. For example, the data store 106 may include data and instructions that, when executed by the processing resource 102, cause the host computing system 100 to run an operating system session. The operating system may be any one of a number of operating systems, such as a Microsoft® Windows® operating system, an Apple® OS operating system, a Unix or Linux based operating system, an Android® operating system, and/or any other suitable operating system.

The host computing system 100 also includes a first wireless networking device 108 and a second wireless networking device 110 in the example illustrated in FIG. 1. However, in other examples, a single wireless networking device or additional networking devices may be utilized. In the example shown, the first wireless networking device 108 facilitates a first secure connection 132 to the user computing system 130 while the second wireless networking device 110 facilitates a second secure connection to a remote computing system 140. These two secure connections are discussed in more detail below.

The components described as making up the host computing system 100 (e.g., the processing resource 102, the memory resource 104, the data store 106, the first wireless networking device 108, and the second wireless networking device 110) are electronically coupled such as through wires, cabling, and/or electronic circuitry via a system bus 114 that may include a data bus to carry information, an address bus to determine where information should be sent, and a control bus to determine operation. In other examples, individual buses may be utilized rather than a combined system bus, and the term "system bus" should not be construed as limiting the type of bus or buses utilized in connecting the components of the host computing system.

The components making up the host computing system 100 are housed in a case 120 having no communications ports. In other words, no communications devices such as optical drives, USB devices including USB memory devices, display devices, input devices such as a keyboard or mouse, imaging device such as a printer or other similar communications devices can physically connect to the host computing system 100. However, in examples, certain of these devices may connect to the host computing system 100 wirelessly, such as through the first wireless networking device 108, the second wireless networking device 110, or other additional networking devices. By preventing such devices from physically connecting to the host computing system 100, the host computing system can be manufactured more economically, has less ports/parts that can break, and is more secure because unauthorized devices have no way of connecting to the host computing system 100.

In an example, the host computing system 100 includes a battery (not shown), which may be charged through a power port on the host computing system 100. However, the power port does not act as a communications port and is used merely to power and/or charge the host computing system 100.

A user computing system 130 that is in physical proximity 150 to the host computing system 100 is wirelessly communicatively coupleable to the host computing system 100. It should be understood that the user computing system 130 may include any appropriate type of computing device, including for example smartphones, tablets, desktops, laptops, workstations, servers, smart monitors, smart televisions, digital signage, scientific instruments, retail point of sale devices, video walls, imaging devices, peripherals, or the like. The user computing system 130 may include an operating system, such as Android®, Microsoft® Windows®, Apple® iOS®, or another suitable operating system.

The user computing system 130 connects wirelessly to the host computing system 100 via the first wireless networking device 108 of the host computing system 100 using a first secure connection. A user of the user computing system 130 may request the first secure connection with the host computing system 130. However, in other examples, such a request may occur automatically rather than at the request of the user. Once the request is received by the host computing system 100, the host computing system 100 establishes the first secure connection 132 to the user computing system 130 via the first wireless networking device 108.

In order to establish the secure connection 132, the user computing system 130 should be in a physical proximity 150 to the host computing system 100. The physical proximity 150 is shown in FIG. 1 as an area extending a distance around the host computing system 100. The distance may be determined by the signal strength of the first wireless networking device 108 or by other suitable methods. In examples, the distances may vary, and may be 5 feet, 10 feet, 20 feet, 25 feet, 40 feet, or other suitable distances. If the user computing system 130 is outside the physical proximity 150, the user computing device 130 will be unable to form a secure connection 132 with the host computing system 100.

The first secure connection 132 may establish a network, such as an ad hoc network, between the host computing system 100 and the user computing system 130. Information is transmitted between the host computing system 100 and the user computing system 130 securely, such as through a remote desktop protocol session, a virtual private network session, or another suitable secure method.

In one example, the operating system session may be a Microsoft® Windows® operating system session if the host computing system 100 runs the Microsoft® Windows® operating system. In this way, the user of the user computing device 130 may interact with the host computing device 100 using the operating system session. The operating system session provides a secure, familiar, and compatible session experience for the user to access his data, which may be stored in data store 106 of the host computing system 100. When the user computing device 130 travels outside the physical proximity 150, the secure connection 132 may terminate, thereby also terminating the operating system session and access to the user data.

In examples, user computing system 130 may host a conference call when first secure connection 132 to host computing system 100 is established and an operating system session is provided by host computing system 100. As used herein, a "host" of a conference call refers to a computing system that initiates a conference call for attendees and performs some or all hosting activities for conference call attendees. Hosting activities refers to various activities or functions, detailed further below, which may be performed by a computing system to facilitate collaboration during a conference call. In some examples, user computing system 130 may perform all of the hosting activities during a conference call. In other examples, host computing system 100 may perform some of the host activities in conjunction with user computing system 130. For example, host computing system 100 may use processing resource 102, memory resource 104, and data store 106 to assist user computing system 130 to perform hosting activates. In such an example, the operation system session provided by host computing system 100 may perform the hosting activities using a combination of hardware resources of user computing system 130 (e.g., microphone, speaker, processing resource, memory) and at least one of processing resource 102, memory resource 104, and data store 106.

In some examples, more than one computing system may perform hosting activities during a conference call. For example, a first computing system in a first location (e.g., a conference room) may perform hosting activities for the first location and a second computing system may perform certain hosting activities for a second location. In such a manner, user computing system 130 may streamline the process of initiating the conference call and performing hosting abilities.

In an example, user computing system 130 may utilize hardware of the user computing system 130, such as, microphones, speakers, networking device(s), displays, keyboard(s), attached mouse, etc., in conjunction with the operating system session provided by the host computing system 100 to host the conference call. In other examples, user computing system 130 may host the conference call independent of the operating system session provided by host computing system 100. The conference call may be between the user computing system 130, the host computing system 100, and remote user(s). In some examples, user computing system 130 may coordinate the usage of different resources in a certain location to host the conference call and improve conference call connectivity. For example, user computing system 130 may wirelessly couple to hosting computing system 100 and hardware, such as, a wireless router, at the certain location to connect to a network to establish the conference call. In such an example, user computing system 130 may be coupled to a network (e.g., CDMA) via a networking device of user computing system 130. User computing system 130 may act to boost conference call connectivity by determining which connection to the conference call has a higher quality of service and utilizing the higher quality of service connection (e.g., host computing system 100 via second wireless networking device 110, the hardware at the certain location, or user computing system 130 via the networking device). This may increase the quality of service of the conference call.

User computing system 130 may initiate the conference call using any communication scheme to contact a conferencing platform. For example, user computing system 130 may connect to the conferencing platform over a cellular or mobile network, such as a GSM network or a CDMA network. Other suitable types of networks, such as Ethernet, WiFi, WiMAX, WAN, Bluetooth® etc. may also be utilized. In some examples, the conference call may be held via conference calling features of the user computing system 130, such as, CDMA, VoIP, etc., in conjunction with hardware of user computing system 130, such as, microphones, speakers, displays, keyboards, etc. In other examples, user computing system 130 may use hardware devices of host computing system 100 to connect to the conferencing platform. For example, user computing system 130 may be connected to host computing system 100 via first wireless networking device 108 (e.g., a WiFi connection) and may access a conferencing platform via a connection between second wireless networking device 110 and a server for the conferencing platform. In some examples, more than one computing system may be in proximity to host computing system 100 during a conference call. In such an example, host computing system may act as a wireless access point (e.g., a WiFi hotspot) for the computing systems (e.g., a smartphone) to access a network (e.g., a WiFi network) for example to access the conference call.

In an example, user computing system 130 may automatically initiate the conference call at its scheduled time. User computing system 130 may receive a meeting request for the conference call which may include the scheduled time for the conference call, list of attendees, a conferencing platform for the conference call, data to be shared during the conference call, etc. In examples, the meeting request may be provided to user computing system 130 by host computing system 100 or directly from a conference call organizer via, for example, an email, text message, etc. In an example, user computing system 130 may use an internal clock to determine when to initiate the conference call for a user of the user computing system 130. In other examples, the user computing system 130 may initiate a conference call at the scheduled time if the user computing system 130 detects the presence of a person in proximity of the user computing system 130 during a scheduled time for the conference call. However, the examples are not limited thereto and host computing system 100 may initiate the conference call for user computing system 130.

As used herein, a "conferencing platform" may refer to any hardware, programming instruction, user interface, application user interface, etc. which may allow multiple attendees to conduct a conference call such that audio and/or visual data may be shared between users. User computing system 130 may host a conference call using various conferencing platform, such as, GoToMeeting®, WebEx®, Google® Hangouts, Skype®, Lync®, HP® MyRooms, etc. In such examples, the user computing system may log into the conferencing platform and initiate the conference call using the conferencing platform's requirements. In some examples, the user computing system 130 may have credentials to use a conferencing platform or may receive credentials for the conferencing platform from host computing system 100. However, the examples are not limited thereto and user computing system 130 may not host a conference call using a separate conferencing platform, but rather, may act as the conferencing platform for the conference call. In such an example, user computing system 130 may initiate the call using telephonic features of user computing system 130 or host computing system 100, such as, CDMA, VoIP, etc., and may communicate either directly (e.g., wired or wirelessly) or indirectly (e.g., via host computing system 100) with any hardware necessary to host the conference call. User computing system 130 may monitor hardware for quality of service being used for conferencing calling and may switch usage of hardware to use hardware with a higher quality of service. For example, user computing system 130 may determine a quality of service of second networking device 110 to a VoIP network to access the conferencing platform is better than a quality of service of a networking device coupled to user computing system 130 and may initiate the conference call via second networking device 110. Similarly, in such an example, user computing system 130 may switch usage of a networking device during a conference call to increase a quality of service without interrupting the conference call. In an example, quality of service may be monitored and managed using, for example, HP® Velocity Technology.

In some examples, user computing system 130 may receive data to be shared during the meeting including document(s), such as, Microsoft Office® document(s), Adobe® Acrobat document(s), etc., links, such as, uniform resource locator (URL) links, etc. User computing system 130 may receive the data at any time prior to or during the meeting. For example, the data may be provided to user computing system 130 as an attachment to the meeting request or as part of a separate communication with a conference attendee. A conference attendee may designate an order in which to present data during the conference call. For example, a conference attendee may email user computing system 130 an email message stating an order of data presentation (e.g., "display X's PowerPoint first and then display the Excel spreadsheet attached."). User computing system 130 may automatically display via the conferencing platform the data to be shared with conference attendees without user input. User computing system 130 may locally store data to be shared during the conference for presentation or store such data in data store 106 of host computing system 100.

Hosting activities may include capturing audio and/or video from the conference call, powering on hardware associated with the conference call, and analyzing content of the conference call. In some examples, hardware associated with the conference call may be at least one of a projector, a display, an audio system, a CD player, a touch panel, a camera, a video camera, a DVD/DVR player, a VCR player, a lighting system, a window covering, an HVAC system, a security system, a biometric sensor system, and a presence detection system, a digital pen, a digital board, a projected board, a webcam, a three-dimensional camera, a heat imaging camera, etc. In an example, user computing system 130 may connect with hardware associated with the conference call directly, such as, through a wired or wireless connection, or indirectly, such as, via host computing system 100. For example, host computing system 100 may be wirelessly connected to a smart HVAC system and user computing system 130 may connect to the smart HVAC system to adjust the air conditioning of a conference room. In another example, the user computing system may turn on the video camera, microphone, speakers, and digital board in a conference room when initiating a conference call from that conference room.

In some examples, user computing system 130 and/or host computing system 100 may analyze content of the conference call. For example, when the audio and/or video of the conference call are captured, the content of the conference call may be analyzed by performing at least one of speech recognition, voice recognition, handwriting recognition, text analysis, and/or image recognition analysis of the captured content of the conference call. The analysis of the content of the conference call may be used to prepare real-time closed captioning and/or translation of the conference call or a transcript of the conference call. In an example, the text of the real-time closed captioning and/or translation or transcript of the conference call may be further analyzed to determine a task lists based on the content of the conference call, prepare a summary of the content of the conference call, and annotate or tag at least one of an audio recording, a video recording, or a transcript of the content of the conference call, identify a speaker or presenter on the conference call, etc. In some examples, host computing system 100 may perform at least some of the analysis of the content of the conference call and provide the results of the analysis to the user computing system 130. For example, host computing system 100 may analyze audio and video from the conference call provided by user computing system 130 via secure connection 132 to prepare closed captioning of the conference call for hearing impaired attendees or remote users experiencing audio failure. In examples, the analysis of the content of the conference call may be provided to conference attendees in real-time (e.g., via closed captioning) via the conferencing platform or at the end of the conference call (e.g., summary of the content of the conference call). In another example, host computing system may analyze the audio and/or video from the conference call to annotate a transcript of the conference call or a recording of the conference call. For example, the annotations may include various attributes of the conference call, such as, a time stamp, identification of a speaker or presenter, and any visual data being shared during the conference call (e.g., a screen capture).

In some examples, a content of the conference call may include visual information, such as, a white board in proximity of the host computing system, a digital pen, a digital shared workspace of the conference room, and a screen capture of user computing system 130 or other computing systems participating in the conference call. In such examples, handwriting recognition and image recognition analysis of the captured content of the conference call may be used to capture and analyze such data to perform hosting activities. For example, handwriting analysis of a digital pen may allow a more legible version of the handwritten content to be displayed to conference attendees via the conferencing platform. In examples, the user data may be synchronized or updated from time to time through an enterprise environment such as remote computing system 140. For example, user data to be shared with during a conference call may be updated through remote computing system 140. The remote computing system 140 may include any appropriate type of computing device, including for example smartphones, tablets, desktops, laptops, workstations, servers, smart monitors, smart televisions, digital signage, scientific instruments, retail point of sale devices, video walls, imaging devices, peripherals, or the like. In some examples, the remote computing system 140 represents an enterprise environment having a collection of workstations, servers, networking equipment, and other computing devices that make up the enterprise environment. In the example shown in FIG. 1, the remote computing system 140 is outside the physical proximity 150 (i.e., in a remote physical location to the host computing system 100; however, this need not be the case in other examples.

The remote computing system 140 may be wirelessly communicatively coupleable to the host computing system through a second secure connection 142 via the second wireless network device 110 of the host computing system 100. The second secure connection 142 may be established over a cellular or mobile network, such as a GSM network or a CDMA network. Other suitable types of networks, such as Ethernet, WiFi, WiMAX, WAN, etc. may also be utilized. In another example, remote computing system 140 may be communicatively coupleable to user computing system 130 directly.

As used through the disclosure, the networks formed through the secure connections 132 and 142 represent generally hardware components and computers interconnected by communications channels that allow sharing of resources and information. The networks may include a cable, wireless, fiber optic, and/or remote connection via a telecommunication link, an infrared link, a radio frequency link, or any other connectors or systems that provide electronic communication. The networks may include, at least in part, an Intranet, the internet, or a combination of both. The networks may also include intermediate proxies, routers, switches, load balancers, and the like.

Figure 2:
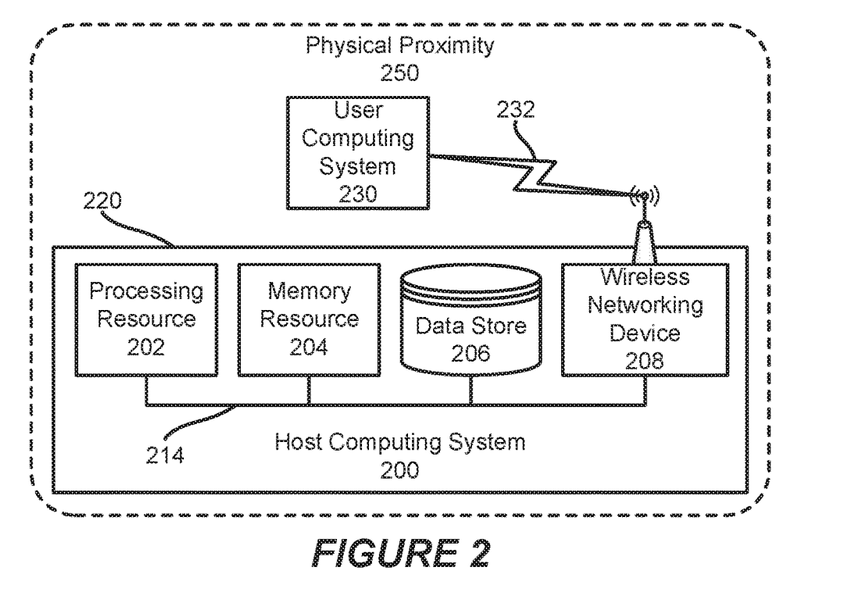
FIG. 2 illustrates a block diagram of a host computing system for wirelessly providing an operating system session to a user computing system in physical proximity to the host computing system via a secure connection according to an example.

FIG. 2 illustrates a block diagram of a host computing system 200 for wirelessly providing an operating system session to a user computing system 230 in physical proximity 250 to the host computing system via a secure connection 232 according to examples of the present disclosure. FIG. 2 includes particular components, modules, etc. according to various examples. However, in different implementations, more, fewer, and/or other components, modules, arrangements of components/modules, etc. may be used according to the teachings described herein. In addition, various components, modules, etc. described herein may be implemented as software modules, hardware modules, special-purpose hardware (e.g., application specific hardware, application specific integrated circuits (ASICs), embedded controllers, hardwired circuitry, etc.), or some combination of these.

The host computing system 200 may include a processing resource 202 that represents generally any suitable type or form of processing unit or units capable of processing data or interpreting and executing instructions. The instructions may be stored on a non-transitory tangible computer-readable storage medium, such as memory resource 204, or on a separate device (not shown), or on any other type of volatile or non-volatile memory that stores instructions to cause a programmable processor to perform the techniques described herein. Alternatively or additionally, the host computing system 100 may include dedicated hardware, such as integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory.

In addition to the processing resource 202 and the memory resource 204, the host computing system 200 may include a data store 206 for storing a variety of data. For example, the data store 206 stores user data relating to the user of the user computing system 230. The user data may include emails, documents, photographs, and other data associated with the user of the user computing system 230. In addition, the data store 206 stores an operating system that is executable by the processing resource 202. For example, the data store 206 may include data and instructions that, when executed by the processing resource 202, cause the host computing system 100 to run an operating system session. The operating system may be any one of a number of operating systems, such as a Microsoft® Windows® operating system, an Apple® OS operating system, a Unix or Linux based operating system, an Android® operating system, and/or any other suitable operating system.

The host computing system 200 also includes a wireless networking device 208 in the example illustrated in FIG. 2. However, in other examples, a single wireless networking device or additional networking devices may be utilized. In the example shown, the wireless networking device 208 facilitates a secure connection 232 to the user computing system 230.

The components described as making up the host computing system 200 (e.g., the processing resource 202, the memory resource 204, the data store 206, and the wireless networking device 208) are electronically coupled such as through wires, cabling, and/or electronic circuitry via a system bus 214 that may include a data bus to carry information, an address bus to determine where information should be sent, and a control bus to determine operation. In other examples, individual buses may be utilized rather than a combined system bus, and the term "system bus" should not be construed as limiting the type of bus or buses utilized in connecting the components of the host computing system.

The components making up the host computing system 200 are housed in a case 220 having no communications ports. In other words, no communications devices such as optical drives, USB devices including USB memory devices, display devices, input devices such as a keyboard or mouse, imaging device such as a printer or other similar communications devices can physically connect to the host computing system 200. However, in examples, certain of these devices may connect to the host computing system 200 wirelessly, such as through the wireless networking device 108 or other additional networking devices. By preventing such devices from physically connecting to the host computing system 200, the host computing system can be manufactured more economically, has less ports/parts that can break, and is more secure because unauthorized devices have no way of connecting to the host computing system 200.

In an example, the host computing system 200 includes a battery (not shown), which may be charged through a power port on the host computing system 200. However, the power port does not act as a communications port and is used merely to power and/or charge the host computing system 200.

A user computing system 230 that is in physical proximity 250 to the host computing system 200 is wirelessly communicatively coupleable to the host computing system 200. It should be understood that the user computing system 230 may include any appropriate type of computing device, including for example smartphones, tablets, desktops, laptops, workstations, servers, smart monitors, smart televisions, digital signage, scientific instruments, retail point of sale devices, video walls, imaging devices, peripherals, or the like. The user computing system 230 may include an operating system, such as Android®, Microsoft® Windows®, Apple® iOS®, or another suitable operating system.

The user computing system 230 connects wirelessly to the host computing system 200 via the first wireless networking device 208 of the host computing system 200 using a first secure connection. A user of the user computing system 200 may request the first secure connection with the host computing system 230. However, in other examples, such a request may occur automatically rather than at the request of the user. Once the request is received by the host computing system 200, the host computing system 200 establishes the first secure connection 232 to the user computing system 230 via the first wireless networking device 208.

In order to establish the secure connection 232, the user computing system 230 should be in a physical proximity 250 to the host computing system 100. The physical proximity 250 is shown in FIG. 2 as an area extending a distance around the host computing system 200. The distance may be determined by the signal strength of the first wireless networking device 208 or by other suitable methods. In examples, the distances may vary, and may be 5 feet, 10 feet, 20 feet, 25 feet, 40 feet, or other suitable distances. If the user computing system 230 is outside the physical proximity 250, the user computing device 130 will be unable to form a secure connection 232 with the host computing system 200.

The first secure connection 232 may establish a network, such as an ad hoc network, between the host computing system 200 and the user computing system 230. Information is transmitted between the host computing system 200 and the user computing system 230 securely, such as through a remote desktop protocol session, a virtual private network session, or another suitable secure method.

Once the secure connection 232 is establishing between the user computing system 230 and the host computing system 200, the host computing system 200 provides an operating system session to the user computing system 230 through the secure connection 232. This may occur while the user computing system 230 is in physical proximity 250 to the host computing system 200 and may terminate if the user computing system 230 travels outside the physical proximity 250.

In one example, the operating system session may be a Microsoft® Windows® operating system session if the host computing system 200 runs the Microsoft® Windows® operating system. In this way, the user of the user computing system 230 may interact with the host computing device 200 using the operating system session. The operating system session provides a secure, familiar, and compatible session experience for the user to access his data, which may be stored in data store 206 of the host computing system 200. In an example, the operating system session may be used by user computing system 230 to host a conference call, as described above with respect to FIG. 1. When the user computing system 230 travels outside the physical proximity 250, the secure connection 232 may terminate, thereby also terminating the operating system session and access to the user data. In examples, the user data may be synchronized or updated from time to time through an enterprise environment such as a remote computing system (not shown). The remote computing system may include any appropriate type of computing device, including for example smartphones, tablets, desktops, laptops, workstations, servers, smart monitors, smart televisions, digital signage, scientific instruments, retail point of sale devices, video walls, imaging devices, peripherals, or the like. In some examples, the remote computing system represents an enterprise environment having a collection of workstations, servers, networking equipment, and other computing devices that make up the enterprise environment.

The remote computing system may be wirelessly communicatively coupleable to the host computing system through a second secure connection via the second wireless network device of the host computing system 200. The second secure connection may be established over a cellular or mobile network, such as a GSM network or a CDMA network. Other suitable types of networks, such as Ethernet, WiFi, WiMAX, WAN, etc. may also be utilized. In another example, the remote computing system may be communicatively coupleable (e.g., wired or wirelessly) to user computing system 230 directly.

As used through the disclosure, the networks formed through the secure connection (such as secure connection 232) represent generally hardware components and computers interconnected by communications channels that allow sharing of resources and information. The networks may include a cable, wireless, fiber optic, and/or remote connection via a telecommunication link, an infrared link, a radio frequency link, or any other connectors or systems that provide electronic communication. The networks may include, at least in part, an Intranet, the internet, or a combination of both. The networks may also include intermediate proxies, routers, switches, load balancers, and the like.

Figure 3A:
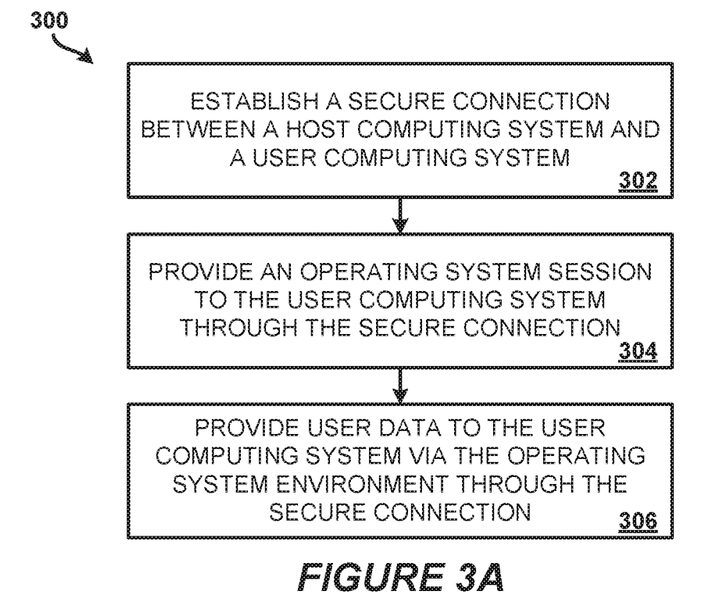
FIGS. 3A and 3B illustrate flow diagrams of a method for wirelessly providing an operating system session to a user computing system in physical proximity to the host computing system via a secure connection according to an example.
Figure 3B:
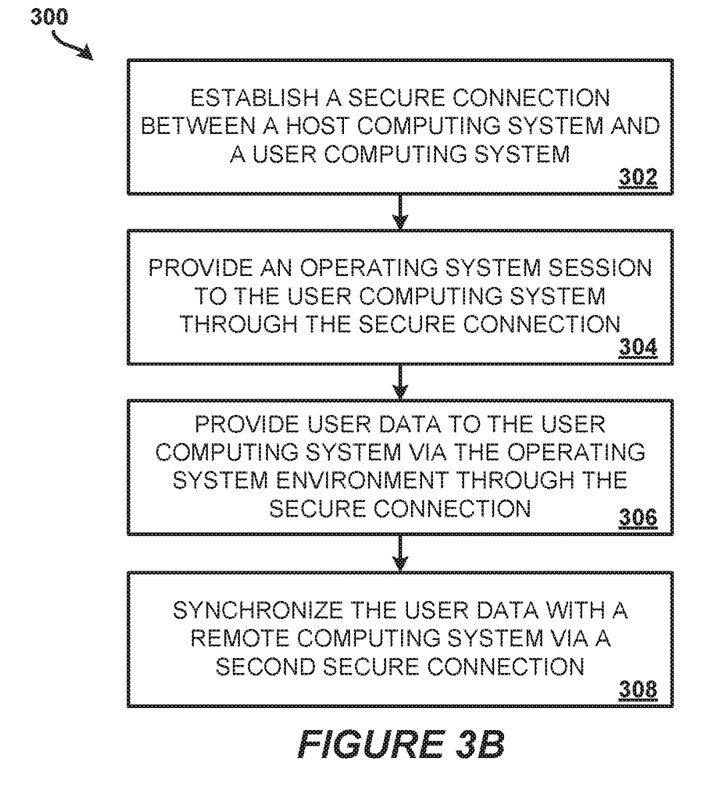

FIGS. 3A and 3B illustrate flow diagrams of a method 300 for wirelessly providing an operating system session to a user computing system in physical proximity to the host computing system via a secure connection according to examples of the present disclosure. The method 300 may be executed by a computing system or a computing device such as host computing system 100 of FIG. 1 and/or host computing system 200 of FIG. 2.

In examples, method 300 may include: establishing a secure connection between a host computing system and a user computing system (block 302); providing an operating system session to the user computing system through the secure connection (block 304); and providing user data to the user computing system via the operating system environment through the secure connection (block 306). In other examples, the method 300 may also include synchronizing the user data with a remote computing system via a second secure connection (block 308).

At block 302, the method 300 may include establishing a secure connection between a host computing system and a user computing system. For example, a host computing system (e.g., host computing system 100 of FIG. 1 and/or host computing system 200 of FIG. 2) establishing a secure connection to a user computing system (e.g., user computing system 130 of FIG. 1 and/or user computing system 230 of FIG. 2) via a wireless network in response to receiving a secure connection request from the user computing system, wherein the host computing system and the user computing system are in physical proximity to each other as described regarding FIGS. 1 and 2. The secure connection may be a remote desktop protocol connection, a virtual private network connection, or other suitable type of connection. The physical proximity may be a distance of 25 feet or less, for example, or may be another suitable distance. The physical proximity may be determined by the range or signal strength of the wireless network. The method 300 continues to block 304.

At block 304, the method 300 may include providing an operating system session to the user computing system through the secure connection. For example, the host computing system (e.g., host computing system 100 of FIG. 1 and/or host computing system 200 of FIG. 2) provides an operating system session to the user computing system (e.g., user computing system 130 of FIG. 1 and/or user computing system 230 of FIG. 2) through the secure connection while the host computing system and the user computing system remain in physical proximity to each other, wherein the operating system is stored on and executable by the host computing system as described regarding FIGS. 1 and 2. The method 300 continues to block 306.

At block 306, the method 300 may include providing user data to the user computing system via the operating system environment through the secure connection. For example, the host computing system (e.g., host computing system 100 of FIG. 1 and/or host computing system 200 of FIG. 2) provides data associated with a user of the user computing system (e.g., user computing system 130 of FIG. 1 and/or user computing system 230 of FIG. 2) to the user computing system via the operating system session through the secure connection, wherein the data associated with the user of the user computing device is stored in a data store of the host computing system.

In some examples such as illustrated in FIG. 3B, the method 300 may also include synchronizing the user data with a remote computing system via a second secure connection. For example, the host computing system (e.g., host computing system 100 of FIG. 1 and/or host computing system 200 of FIG. 2) synchronizes the data associated with the user with a remote computing system (e.g., remote computing system 140 of FIG. 1) via a second secure connection, the remote computing system being in remote physical location to the host computing system. In examples, the second secure connection is a virtual private network connection or other suitable type of connection.

Additional processes also may be included, and it should be understood that the processes depicted in FIGS. 3A and 3B represent illustrations, and that other processes may be added or existing processes may be removed, modified, or rearranged without departing from the scope and spirit of the present disclosure.

Figure 4:
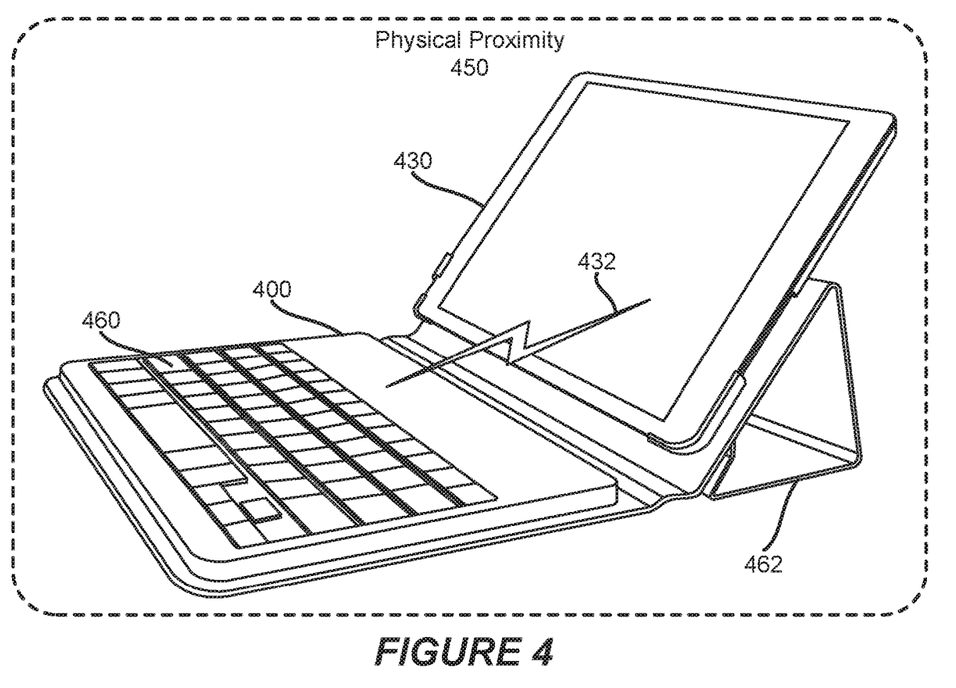
FIG. 4 illustrates a block diagram of a host computing system for wirelessly providing an operating system session to a user computing system in physical proximity to the host computing system via a secure connection according to examples of the present disclosure.

FIG. 4 illustrates a block diagram of a host computing system 400 for wirelessly providing an operating system session to a user computing system 430 in physical proximity 450 to the host computing system 400 via a secure connection according to examples of the present disclosure. The example illustrated in FIG. 4 is a particular implementation of the systems, methods, devices, and techniques described herein.

In this example, the host computing system 400 and the user computing system 430 are physically connected to a case 462. However, the host computing system 400 and the user computing system 430 need not be otherwise physically connected, and the case is merely a convenient way to store the two systems together. However, the host computing system 400 and the user computing system 430 are in a physical proximity 450 to each other.

The host computing system 400 may include all of the elements as described in FIGS. 1 and 2 relating to the host computing system 100 and 200 respectively. For example, although not shown, the host computing system 400 may include at least a processing resource, a memory resource, a data store, and a wireless networking device. Other elements may also be included as described herein. In the example shown in FIG. 4, the host computing system 400 includes a keyboard 460 for inputting information. In one example, the keyboard 460 may be used to input information directly onto the user computing system 430 regardless of whether a secure connection 432 is established between the host computing system 400 and the user computing system 430. In other words, the keyboard 460 may connect directly to the user computing system 430 for the purposes of inputting information, such as via a wireless connection (e.g., Bluetooth, WiFi, radio frequency, infrared, or other wireless connection types).

In other examples, when the secure connection 432 is established between the host computing system 400 and the user computing system 430, the keyboard 430 may be utilized to input information onto the host computing system 400 via the operating system session provided to the user computing system 430 by the host computing system 400.

Figure 5:
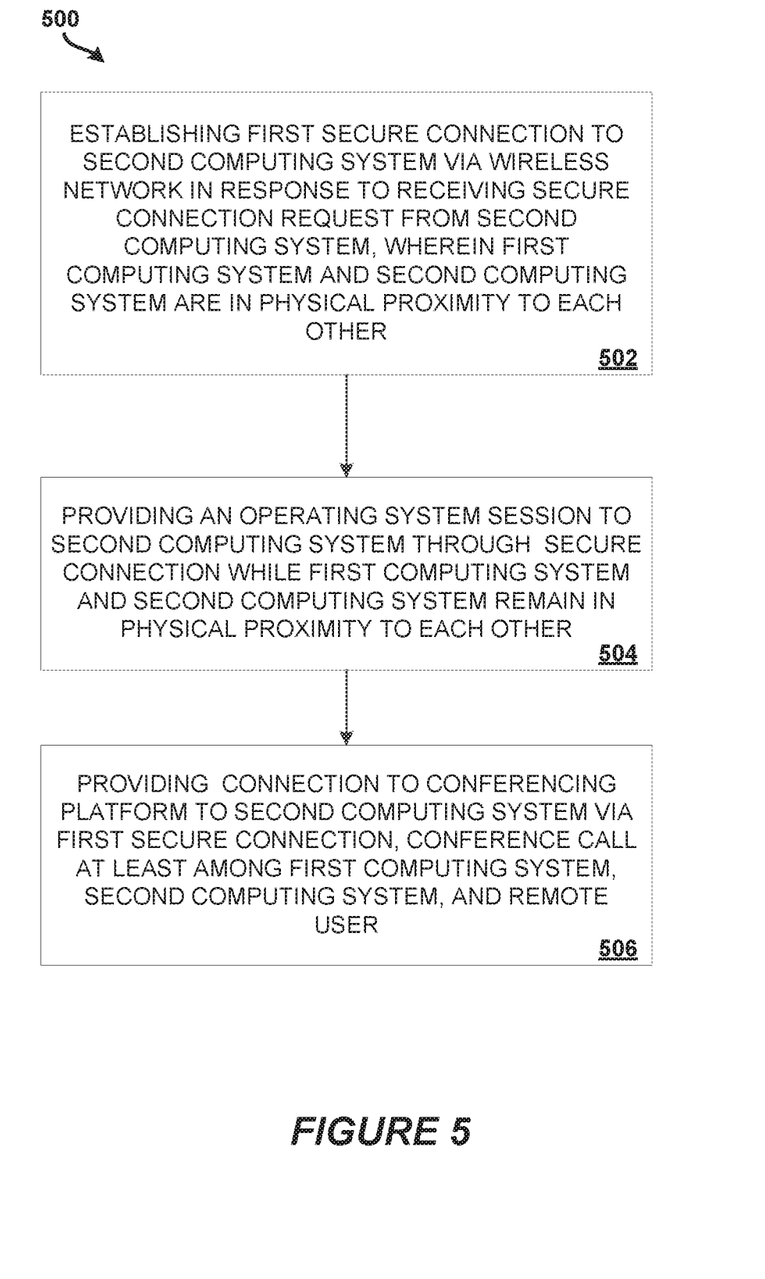
FIG. 5 is a flowchart of a method for hosting a conference call according to an example.

FIG. 5 is a flowchart of a method for hosting a conference call according to an example. The method 500 may be executed by a computing system or a computing device such as host computing system 100 of FIG. 1 and/or host computing system 200 of FIG. 2.

In examples, method 500 may include: establishing a secure connection between a first computing system and a second computing system (block 502); providing an operating system session to the second computing system through the secure connection (block 504); providing a connection to a conferencing platform via secure connection to the second computing system (block 506).

At block 502, the method 500 may include establishing a secure connection between a first computing system and a second computing system. For example, a first computing system (e.g., host computing system 100 of FIG. 1 and/or host computing system 200 of FIG. 2) may establish a secure connection to a second computing system (e.g., user computing system 130 of FIG. 1 and/or user computing system 230 of FIG. 2) via a wireless network in response to receiving a secure connection request from the second computing system, wherein the first computing system and the second computing system are in physical proximity to each other as described with regards to FIGS. 1 and 2. The secure connection may be a remote desktop protocol connection, a virtual private network connection, or other suitable type of connection. The physical proximity may be a distance of 25 feet or less, for example, or may be another suitable distance. The physical proximity may be determined by the range or signal strength of the wireless network. The method 500 continues to block 504.

At block 504, the method 500 may include providing an operating system session by the first computing system to the second computing system through the secure connection. For example, the first computing system (e.g., host computing system 100 of FIG. 1 and/or host computing system 200 of FIG. 2) may provide an operating system session to the second computing system (e.g., user computing system 130 of FIG. 1 and/or user computing system 230 of FIG. 2) through the secure connection while the first computing system and the second computing system remain in physical proximity to each other, wherein the operating system is stored on and executable by the first computing system as described with regards to FIGS. 1 and 2. The method 500 continues to block 506.

At block 506, the method 500 may include providing a connection to a conferencing platform by the first computing system to the second computing system via the first secure connection. The conference call being at least among the first computing system, the second computing system, and a remote user. For example, the host computing system (e.g., host computing system 100 of FIG. 1 and/or host computing system 200 of FIG. 2) may provide a connection to a conferencing platform (e.g., user computing system 130 of FIG. 1 and/or user computing system 230 of FIG. 2) to the second computing system via the secure connection, the conference call being at least among the first computing system, the second computing system, and a remote user.

Additional processes also may be included, and it should be understood that the processes depicted in FIG. 5 represent illustrations, and that other processes may be added or existing processes may be removed, modified, or rearranged without departing from the scope and spirit of the present disclosure.

Figure 6:
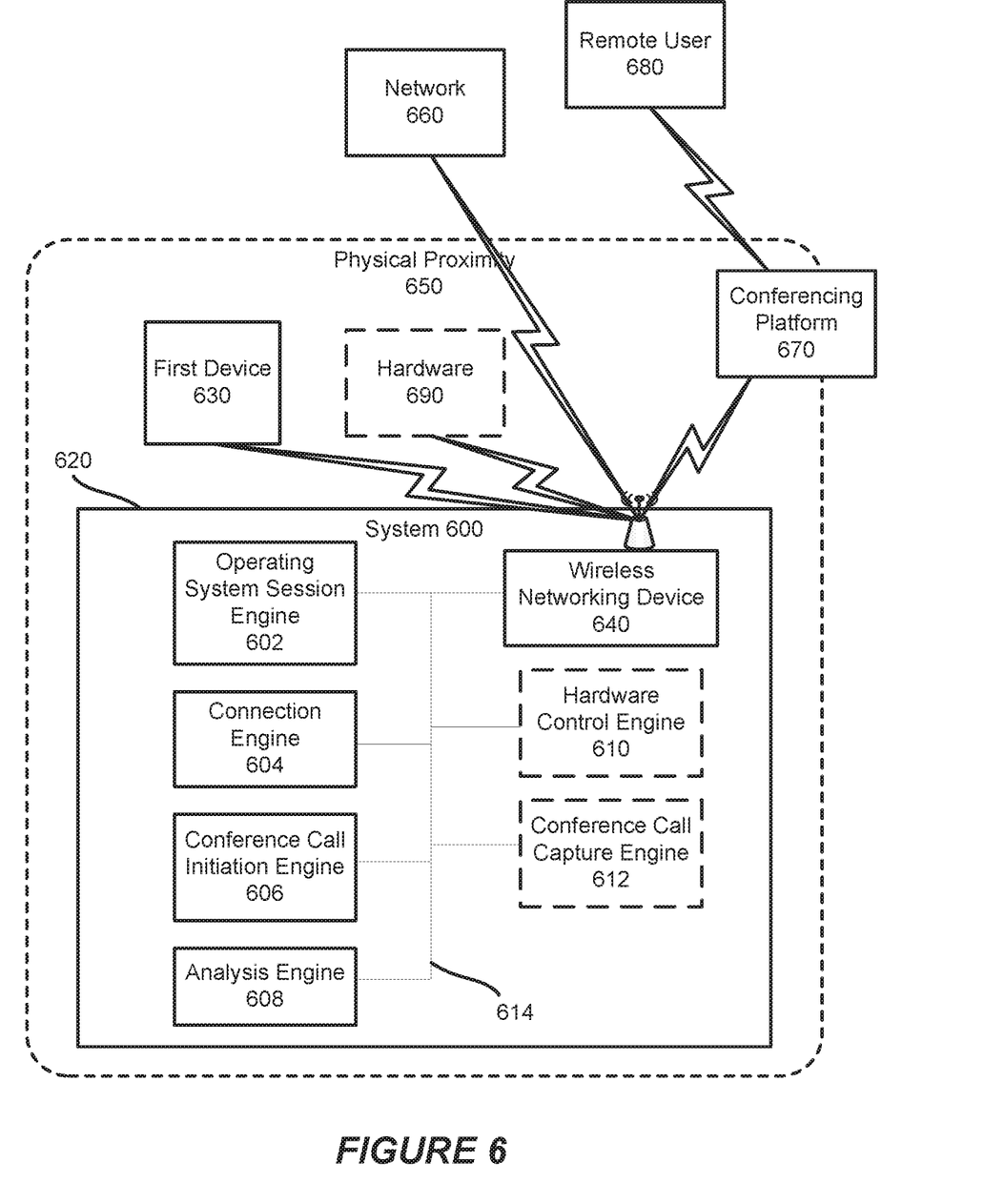
FIG. 6 illustrates a block diagram of an example system to provide a connection to a conferencing platform to a device according to an example.

FIG. 6 is a block diagram of an example system 600 to provide a connection to a conferencing platform to a first device 630. In the example of FIG. 6, system 600 includes at least engines 602, 604, 606, 608, 610, and 612, which may be any combination of hardware and programming to implement the functionalities of the engines. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 602, 604, 606, 608, 610, and 612. In such examples, system 600 may include the machine-readable storage medium storing the instructions and the processing resource to execute the instructions, or the machine-readable storage medium may be separate but accessible to system 600 and the processing resource.

In some examples, the instructions can be part of an installation package that, when installed, can be executed by the processing resource to implement at least engines 602, 604, 606, 608, 610, and 612. In such examples, the machine-readable storage medium may be a portable medium, such as a CD, DVD, or flash drive, or a memory maintained by a computing device from which the installation package can be downloaded and installed. In other examples, the instructions may be part of an application, applications, or component already installed on system 600 including the processing resource. In such examples, the machine-readable storage medium may include memory such as a hard drive, solid state drive, or the like. In other examples, the functionalities of any engines of system 600 may be implemented in the form of electronic circuitry.

In the example of FIG. 6, operating system session engine 602 may provide an operating system session to first device 630 via wireless networking device 640 when the first device is in physical proximity 650 of the system 600. In the example of FIG. 6, system 600 may be a computing system such as host computing system 100 of FIG. 1 and host computing system 200 of FIG. 2. In such an example, the components making up the host computing system 600 are housed in a case 620 having no communications ports, as described above with respect to FIGS. 1 and 2. First device 630 may be a computing system such as user computing system 130 of FIG. 1 and user computing system 230 of FIG. 2 in physical proximity 650 of system 600. Although, wireless networking device 640 is depicted as a single wireless networking device, the examples are not limited thereto and more than one wireless networking device may be included in system 600.

Connection engine 604 may provide a secure connection to network 660 to first device 630 while first device 630 is in physical proximity 650 of system 600 as described above with reference to FIGS. 1-5.

Conference call initiation engine 606 may establish a wireless connection with conferencing platform 670 and provide the connection with conferencing platform 670 to first device 630 via wireless networking device 640. In such an example, conferencing platform 670 may include components which are in physical proximity 650 with system 600. In other example, conferencing platform 670 may not be in physical proximity of system 600. In an example, first device 630 may host a conference call via conferencing platform 670 with at least remote user 680 and system 600. In such an example, remote user 680 may not be in physical proximity 650 of first device 630. In some examples, remote user 680 may wirelessly couple to conferencing platform 670. However, the examples are not limited thereto and remote user 680 may connect to conferencing platform 670 via a wired connection.

Analysis engine 608 may analyze a content of the conference call received from first device 630 and provide the analysis of the content to conference attendees. In such an example, conference attendees include system 600, first device 630, and remote user 680. In some examples, the analysis engine 608 may perform at least one of speech recognition, voice recognition, handwriting recognition, text analysis, and image recognition of the content of the conference call. In such an example, a result of the analysis of the content of the conference call may include at least one of a closed captioning and/or translation of the content of the conference call, a transcript of the content of the conference call, a task lists according to the content of the conference call, a summary of the content of the conference call, and an annotated content of the conference call, as described above with respect to FIGS. 1-5. In some examples, the annotated content of the conference call may include at least one of an audio recording, a video recording, and the transcript of the content of the conference call tagged with at least one of an identify of a speaker or presenter, a time-stamp, and a screen capture.

As described above with reference to FIGS. 1-5, the components described as making up the system 600 are electronically coupled such as through wires, cabling, and/or electronic circuitry via a system bus 614 that may include a data bus to carry information, an address bus to determine where information should be sent, and a control bus to determine operation. In other examples, individual buses may be utilized rather than a combined system bus, and the term "system bus" should not be construed as limiting the type of bus or buses utilized in connecting the components of the host computing system.

In some examples, system 600 may also include hardware control engine 610 to control wirelessly coupled hardware 690 to provide hosting activities of the conference call in response to an instruction from first device 630. Hardware 690 may be in physical proximity 650 with system 600 and first device 630. Hardware 690 may be at least one of a projector, a display, an audio system, a CD player, a touch panel, a camera, a video camera, a DVD/DVR player, a VCR player, a lighting system, a window covering, an HVAC system, a security system, a biometric sensor system, and a presence detection system, a digital pen, a digital board, a projected board, a webcam, a three-dimensional camera, and a heat imaging camera or any hardware described above with respect to FIGS. 1-5. In other examples, first device 630 may directly communicate with hardware 690 either via a wired or wireless connection.

In some examples, system 600 may include a conference call capture engine 612 to capture the content of the conference call in response to conference call initiation engine 606 establishing the wireless connection with conferencing platform 670 via wireless networking device 640. In some examples, conference call capture engine 612 may capture the content of the conference call through the operating system session provided by operating system session engine 602. In an example, the content of the conference call may include audio and/or visual data shared between conference attendees. In some examples, a video from the conference call may capture at least one of a white board in physical proximity 650 of the system 600, a digital pen, a digital shared workspace of the conference room, and a screen shot of first device 630.

It should be emphasized that the above-described examples are merely possible examples of implementations and set forth for a clear understanding of the present disclosure. Many variations and modifications may be made to the above-described examples without departing substantially from the spirit and principles of the present disclosure. Further, the scope of the present disclosure is intended to cover any and all appropriate combinations and subcombinations of all elements, features, and aspects discussed above. All such appropriate modifications and variations are intended to be included within the scope of the present disclosure, and all possible claims to individual aspects or combinations of elements or steps are intended to be supported by the present disclosure.

What is claimed is:

1. A system comprising:
   a first device to:
   establish a wireless network connection with a second device;
   establish a conferencing platform session with a conferencing platform via a connection to the conferencing platform; and
   provide the conferencing platform session to the second device via the wireless network connection with the second device.

2. The system of claim 1, wherein the first device comprises a wireless access point to provide each of a plurality of devices, including the second device access to the connection to the conferencing platform.

3. The system of claim 1, wherein the conferencing platform session is accessible to a remote device via a separate connection between the remote device and the conferencing platform.

4. The system of claim 1, wherein the conferencing platform session is accessible to the second device via a separate connection between the second device and the conferencing platform.

5. The system of claim 4, wherein the second device selects between access to the conferencing platform session provided by the first device via the wireless network connection to the second device and access to the conferencing platform session provided via the separate connection between the second device and the conferencing platform.

6. A method comprising:
   establishing a wireless network connection between a first device and a second device that is in a proximity to the first device;
   establishing, by the first device, a conferencing platform session via a connection between the first device and a conferencing platform;
   providing, by the first device, access to the conferencing platform session to the second device via the e network connection between the first device and the second device.

7. The method of claim 6, including identifying a user in a proximity to the second device.

8. The method of claim 7, including establishing the conferencing platform session for the user responsive to identifying the user in the proximity to the second device at a scheduled time of the conferencing platform session.

9. The method of claim 6, including utilizing hardware integrated in the first computing device to capture audio and video during the conferencing platform session.

10. A non-transitory machine-readable storage medium storing instructions executable by a processing resource to:
    establish a wireless network connection with a computing device,
    establish a conferencing platform session via a connection with a conferencing platform;
    provide access to the conferencing platform session to the computing device via the wireless network connection with the computing device; and
    control conferencing hardware via a connection with the conferencing hardware to provide hosting activities associated with the conferencing platform session.

11. The non-transitory machine-readable storage medium of claim 10, including instructions executable by the processing resource to capture content communicated during the conferencing platform session.

12. The non-transitory machine-readable storage medium of claim 11, including instructions executable by the processing resource to generate a transcript of the captured content.

13. The non-transitory machine-readable storage medium of claim 11, including instructions executable by the processing resource to generate a translation of the captured content.

14. The non-transitory machine-readable storage medium of claim 10, wherein the conferencing hardware includes a device utilized to display content communicated during the conferencing platform session.

15. The non-transitory machine-readable storage medium of claim 10, wherein the conferencing hardware includes a building management system that manages a conference room where the second device is located during the conferring platform session.

\* \* \* \* \*